May 16, 1939.  L. F. ENGELHARDT  2,158,676
WING FLAP MECHANISM
Filed Feb. 24, 1938  2 Sheets-Sheet 1
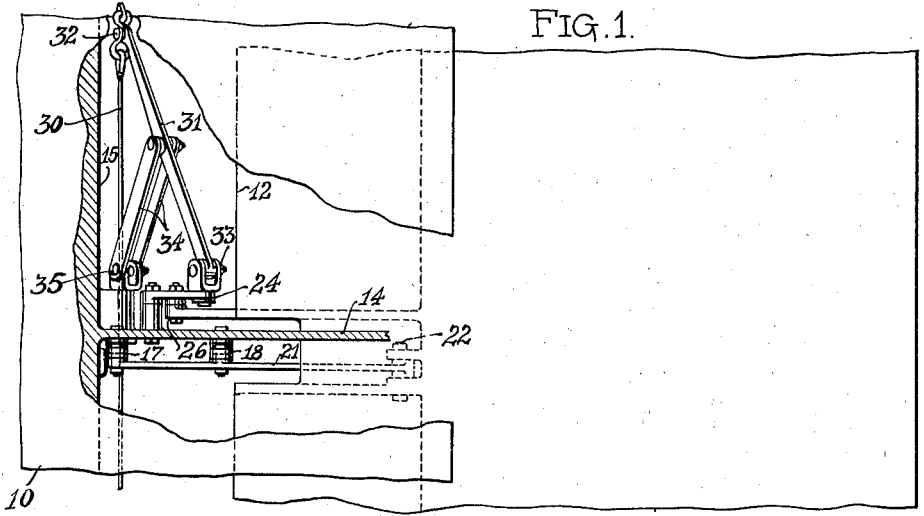
FIG. 1.
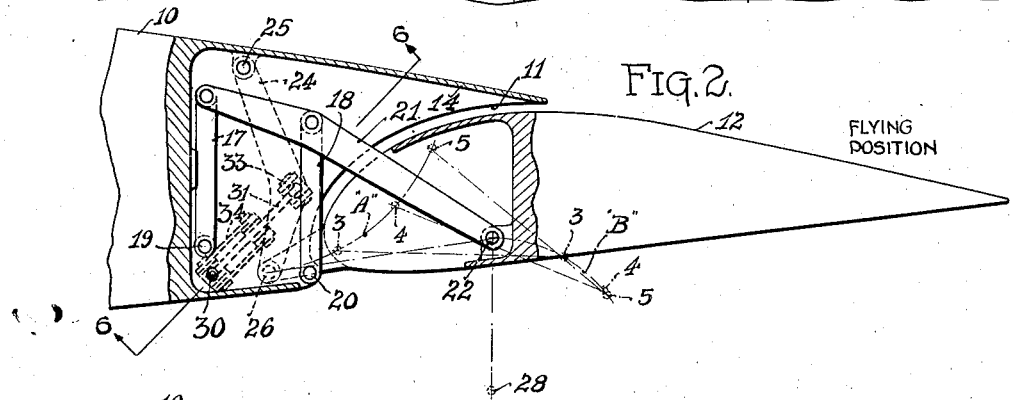
FIG. 2.  FLYING POSITION
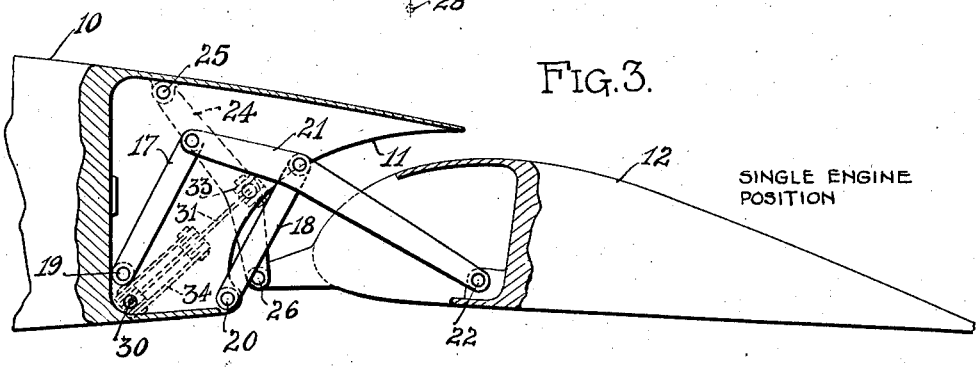
FIG. 3.  SINGLE ENGINE POSITION
INVENTOR
LLOYD F. ENGELHARDT.
BY
ATTORNEY

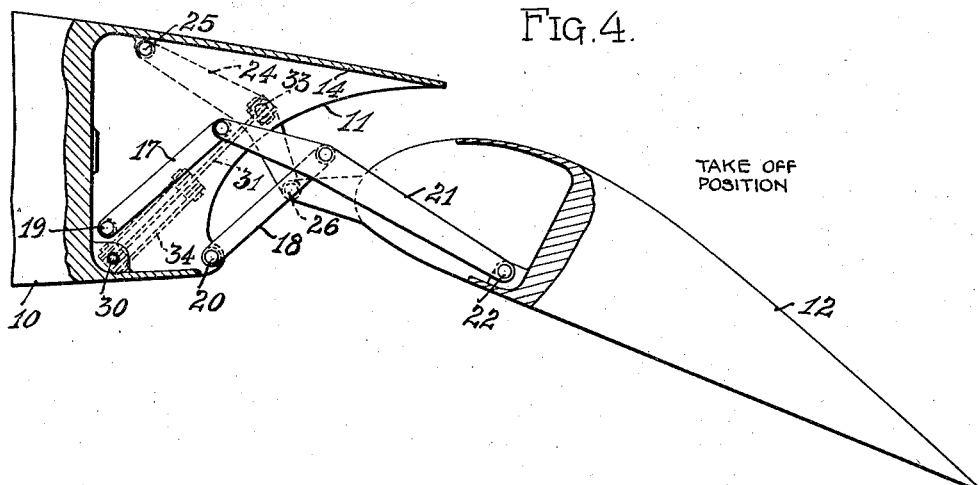
Fig. 4. TAKE OFF POSITION
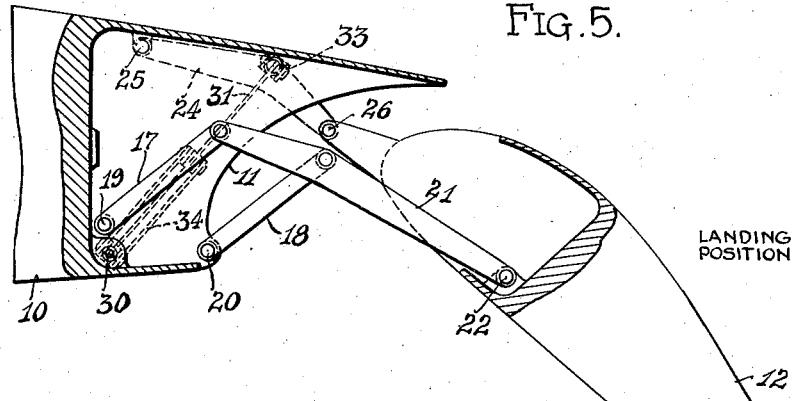
Fig. 5. LANDING POSITION
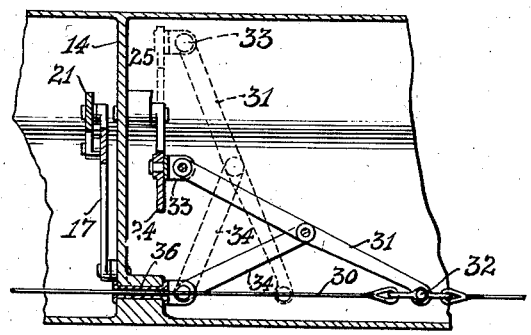
Fig. 6.
INVENTOR
LLOYD F. ENGELHARDT.
BY
ATTORNEY Patented May 16, 1939

2,158,676

UNITED STATES PATENT OFFICE 2,158,676

WING FLAP MECHANISM

Lloyd F. Engelhardt, Ferguson, Mo., assignor to Curtiss-Wright Corporation, a corporation of Delaware Application February 24, 1938, Serial No. 192,242

9 Claims. (Cl. 244—42)

This invention relates to aircraft and is particularly concerned with improvements in supports and operating means for trailing edge flaps as applied to the main supporting wings of aircraft.

Generally speaking, the use of trailing edge flaps is well-known in the art, such flaps taking the form of auxiliary airfoils mounted adjacent the trailing edge of the wing, the flaps being movable either rearwardly or downwardly or both for the purpose of increasing the lift and/or drag characteristics of the wing for certain flight maneuvers. According to the teachings of this invention, the trailing edge flap is so supported that it may be moved rearwardly with respect to the wing and at the same time, the flap is tilted to increase its angle of incidence. The invention provides for a first phase of flap movement wherein the flap is extended rearwardly without any substantial increase in the angle of incidence, this rearward movement providing for the formation of a substantial slot between the trailing edge of the wing and the leading edge of the flap. In the second phase of flap movement, comprising a blended continuation of the first phase, accomplished by the same control means as utilized in the first phase of movement, the flap is tilted to increase its angle of incidence without any substantial rearward movement thereof. The supporting and operating mechanism is so organized as to hold the leading edge of the flap directly rearward of the wing, and the supporting and operating mechanism is so arranged as to lie wholly within the wing profile, obviating the drag which would be occasioned by projecting flap supporting devices.

A clearer understanding of the provision of the invention may be obtained by reading the following detailed description in connection with the drawings in which;

Fig. 1 is a fragmentary plan, partly broken away, of an airplane wing and a flap;

Figs. 2 to 5 inclusive are sectional elevations of the wing and flap showing the supporting and operating mechanism in different positions of adjustment, and Fig. 6 is a section on the line 6—6 of Fig. 2.

A main wing or supporting surface is shown at 10, the trailing edge thereof being cut away at 11 to form a recess within which the leading edge portion of a flap 12 may nest. A frame member 14 extends rearwardly from a main wing spar 15 to provide a mounting for the flap supports. As shown in Figs. 2 to 5, substantially parallel links 17 and 18, of similar length, are hinged at their lower ends, as at 19 and 20, to the member 14. The upper ends of the links are bridged by a member 21 to which they are pivoted, the member extending downwardly and rearwardly to carry the flap 12 by a pivoted connection 22. The point 22 is located on the flap close to the chord line at a distance rearward from the leading edge substantially equivalent to the distance of the center of pressure from the leading edge.

Further support is provided for the flap in the form of an arm 24 pivoted at 25 adjacent an upper border of the member 14, the arm 24 being pivoted at its lower end to a horn projecting from the leading edge of the flap 12, this pivot being indicated at 26. It will be apparent that the point 26 moves in an arcuate orbit designated at A in Fig. 2, while the point 22 on the flap moves in an arcuate orbit designated at B, this latter orbit being determined by the geometrical relationship of the links 17 and 18 and the member 21. Preferably, the orbit A comprises an arc whose forward end is substantially tangent to a line parallel to the wing chord and likewise, the forward end of the arcuate orbit B is substantially tangent to a line parallel to the wing chord. The orbit A swings rearwardly and upwardly about the point 25 as a center while the orbit B swings rearwardly and downwardly about a center 28 below the flap. The points numbered 3, 4, and 5 on orbits A and B designate respectively the positions of the flap pivots 26 and 22 as the arm 24 is swung in a counter-clockwise direction, these corresponding also to the flap positions shown in Figs. 3 4 and 5. In the position of Fig. 2, the chord line of the flap is substantially coincident with the chord line of the wing proper, this representing the normal flying adjustment of the flap. When the flap is applied to a multi-motor airplane, it is desirable to extend the flap to a position such as is shown in Fig. 3 should single engine aircraft operation be necessary. Herein, the lift of the wing and flap combination is increased to some extent without effecting an undue increase in drag. When the aircraft is taking off, a substantial increase in lift is desirable without an undue increase in drag, whereupon the flap may be adjusted to the position shown in Fig. 4. When the aircraft is landing, a considerable increase in drag is desirable, along with an increase in lift, to enable the aircraft to land at low speed; accordingly, the flap may then be adjusted to the position shown in Fig. 5 wherein the flap angle of incidence is increased to a sufficient extent to provide the lift and drag increases necessary. The lift increasing effect of a flap of this type is augmented by the provision of the slot between the wing 10 and the flap 12 and it is largely for this reason that the initial rearward extension of the flap, without an undue increase in its angle of incidence, is provided for. The combination of the arcuate orbits A and B provide a distinctly favorable path of flap movement in this respect, which is not obtained by certain flaps of the prior art which are merely hinged about a single point for change in the flap angle of incidence. Certain flaps of the prior art provide for chord-wise movement of the flap leading edge while the flap angle of incidence is increased but, where slot forming flaps are used, the leading edge of the flap in a case of this kind in not fully protected or masked by the trailing edge of the wing. In this case, the leading edge of the flap is constantly masked by the wing trailing edge to provide not only improved aerodynamic characteristics but also to provide a minimization of any tendency for ice formation on the flap leading elges, which, in the past, has been an occasional cause of aircraft accidents.

I further provide novel means for controlling the operation of the flaps, this comprising a cable 30 extending span-wise of the wing, the cable being moved along its own axis by any suitable means under the control of the pilot. An arm 31 is pivotally connected to the cable at 32 and is universally jointed at 33 to the arm 24. Midway of the arm 31, a pair of links 34 are pivoted, these links extending to a swivel joint 35 including a ferrule 36 (shown in Fig. 6) through which the cable 30 may pass. The links 34 control the movement of the swivel 33 to a plane normal to the cable 30 and in which the arm 24 may move. By axially moving the cable 30 it will be apparent that the arm 24 is swung about its pivot 25 for effecting extension and retraction of the flap. During movement of the arm 24, the arm 31 and the links 34 may swivel as necessary about the axis of the cable 30.

In applying the invention to an aircraft, the flaps normally extend over part or all of the wing span and it is contemplated that a number of supporting and control units such as are shown in Fig. 1 would be spaced along the span of the flap. However, a single cable 30 may be utilized to operate all of the flap control units, the several arms 31 all being clevised to the one cable. The cable 30 is shown as a convenient unitary means for controlling the flap but if desired, alternative mechanical devices may be substituted therefor to give positive and irreversible movement to the arm 31. A screw shaft, for instance, might be substituted for the cable 30 and a nut substituted for the joint 32.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What I claim is:

1. In a wing having a trailing edge flap, chord-wise spaced support pivots on the flap, means for guiding the forward pivot rearwardly and upwardly in a substantially arcuate path, and means guiding the rearward pivot rearwardly and downwardly in a substantially arcuate path, one of said means serving as a device for effecting flap movement relative to the wing, the forwardmost parts of said arcuate paths being substantially tangent to the wing chord line.

2. In a wing having a trailing edge flap, chord-wise spaced support pivots on the flap, means for guiding the forward pivot rearwardly and upwardly in a substantially arcuate path, and means guiding the rearward pivot rearwardly and downwardly in a substantially arcuate path, one of said means serving as a device for effecting flap movement relative to the wing, said arcuate paths respectively being described from centers above and below the wing chord line.

3. In a wing system including a movable auxiliary airfoil, a member pivoted to the wing swingable in a fore-and-aft vertical plane, a link swiveled to said member lying in a plane normal to said vertical plane, a transverse cable shackled to the other end of said link, and a guide link swiveled at its ends to the mid-point of said first link and to the aircraft.

4. In a wing system including a movable auxiliary airfoil, a member pivoted to the wing swingable in a fore-and-aft vertical plane, a link swiveled to said member lying in a plane normal to said vertical plane, a transverse cable shackled to the other end of said link and a guide link, half the length of said first link, swiveled at one end to the mid-point of said first link and swiveled at its other end to the aircraft substantially at the intersection of said cable with said first vertical plane.

5. In an operating device in aircraft a lever swingable on the aircraft in one plane, an operating member translatable along an axis normal to said plane, a member swiveled at its respective ends to said lever and translatable member, and a guide link pivoted at one end to substantially the mid-point of said swiveled member, and at its other end to the aircraft at a point adjacent the intersection of said translatable member with the same plane in which said lever swings.

6. In a wing flap mount for aircraft, a pair of substantially parallel links pivoted at their lower ends to fore-and-aft spaced points of the wing near the trailing edge thereof, a member pivoted to the upper ends of said links and extending rearwardly, the flap being pivoted to the rear end of said member, and means pivoted to another point of said flap for moving the flap to various angular positions relative to the wing, and comprising a swingable member independent of said links pivoted at one end to the aircraft and at its other end to said flap at a point spaced from the pivoting of said first member thereon.

7. In a wing flap mount a first means connected to a forward part of the flap for guiding said part in an upwardly concave arcuate path of movement, a second means connected to a more rearward part of the flap for guiding said latter part in a downwardly concave arcuate path, and a device for enforcing flap movement along said paths.

8. In a wing flap mount a first means connected to a forward part of the flap for guiding said part in an upwardly concave arcuate path of movement, a second means connected to a more rearward part of the flap for guiding said latter part in a downwardly concave arcuate path, and a device for enforcing flap movement along said paths, the said paths, at the forwardmost position of the flap, being substantially tangent to a parallel to the wing chord line.

9. In a wing flap mount a first means connected to a forward part of the flap for guiding said part in an upwardly concave arcuate path of movement, a second means connected to a more rearward part of the flap for guiding said latter part in a downwardly concave arcuate path, and a device for enforcing flap movement along said paths, the said forward path at the forwardmost position of the flap, being substantially tangent to a parallel to the wing chord line.

LLOYD F. ENGELHARDT.